(No Model.) 2 Sheets—Sheet 2.
T. T. A. HANSEN.
CENTRIFUGAL BUTTER EXTRACTOR.
No. 498,470. Patented May 30, 1893.
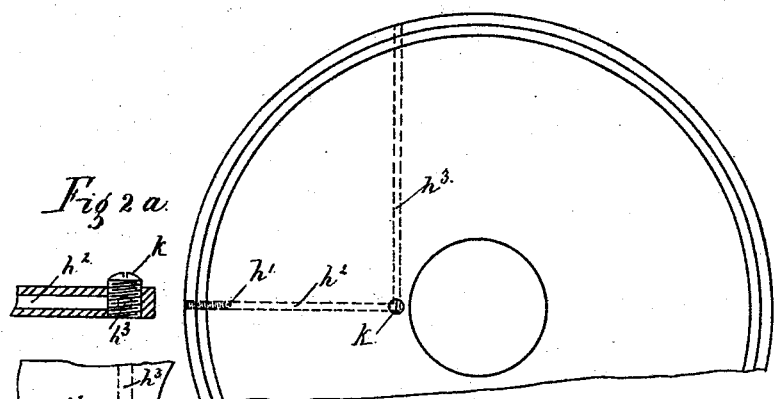
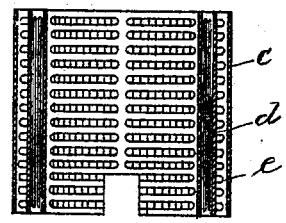
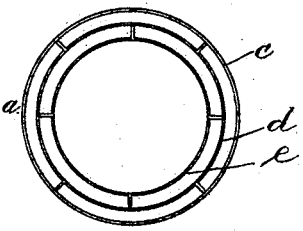
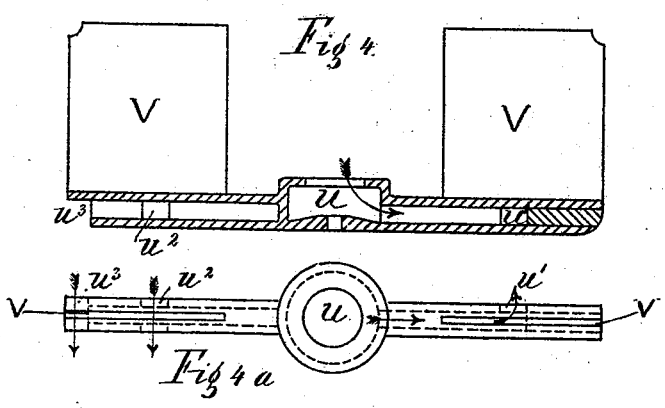
WITNESSES:
Charles Schroeder
H Willard Griffiths
INVENTOR
T. T. A. Hansen
by Goepel & Ruegner
ATTORNEYS

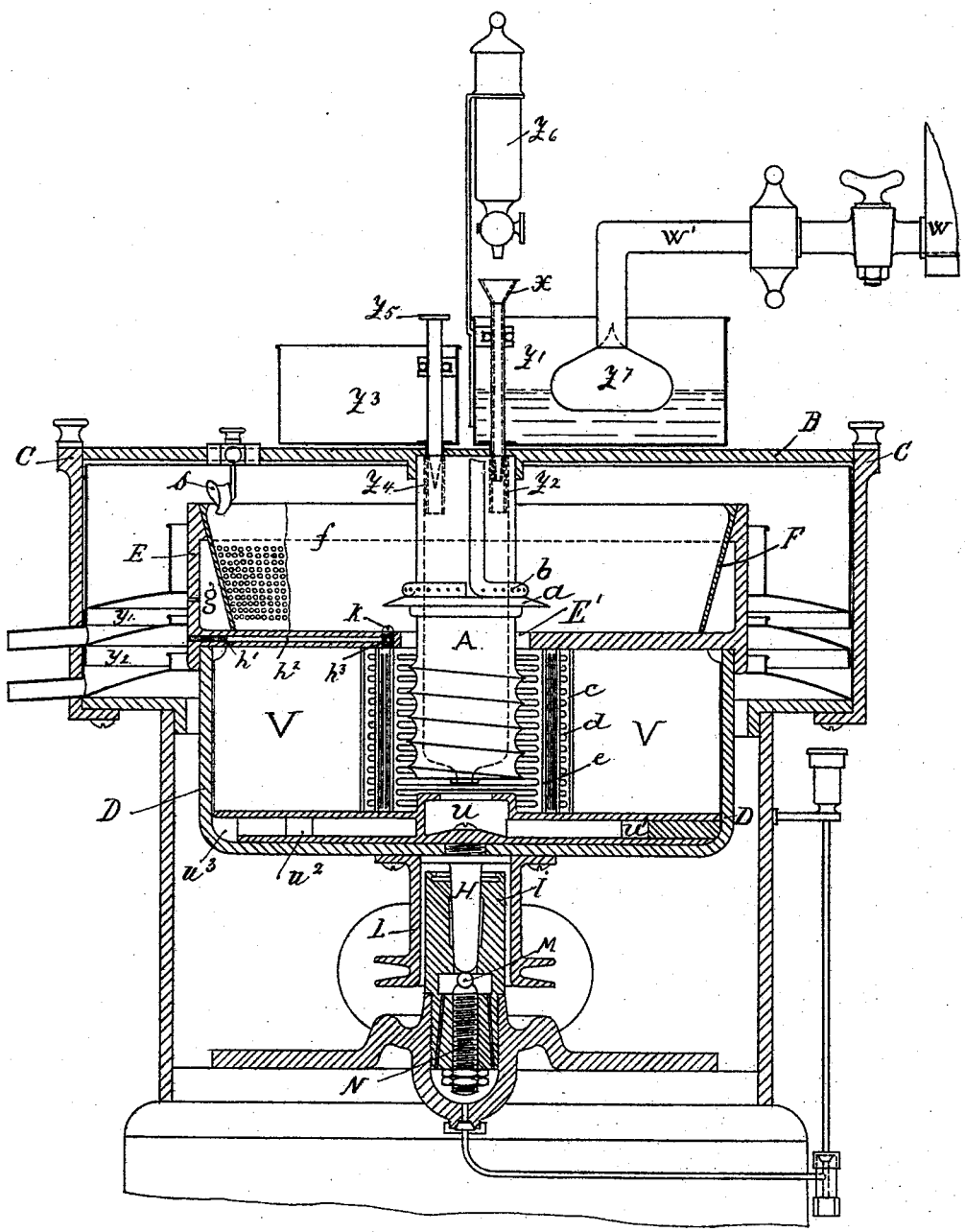

UNITED STATES PATENT OFFICE.

THORVALD TAGE AGATON HANSEN, OF COPENHAGEN, DENMARK.

CENTRIFUGAL BUTTER-EXTRACTOR.

SPECIFICATION forming part of Letters Patent No. 498,470, dated May 30, 1893.

Application filed June 27, 1892. Serial No. 438,234. (No model.)

*To all whom it may concern:*

Be it known that I, THORVALD TAGE AGATON HANSEN, civil engineer, a subject of the King of Denmark, residing at Copenhagen, Denmark, have invented certain new and useful Improvements in Centrifugal Machines, of which the following is a specification.

My invention relates to a new and improved centrifugal machine which is to be used not only for centrifuging milk for the purpose of separating the cream from the same, but also for producing butter or for producing margarine from the fatty oils suitable for the purpose, such as oleomargarine, ground nut oil, &c.

Figure 1 is a vertical transverse sectional view of my improved centrifugal butter-making machine. Fig. 2 is a plan-view of the bottom of the vessel, parts being broken out and the channels being shown in dotted lines. Fig. $2^a$ is an enlarged detail sectional and plan-view of the screw-plug at the junction of the channels. Fig. 3 is a detail vertical transverse sectional view of the annular concentric partition. Fig. $3^a$ is a plan-view of the same. Fig. 4 is a vertical transverse sectional view of the wings, and Fig. $4^a$ is a plan-view of the same.

Similar letters of reference indicate corresponding parts.

From the receptacle W the cream flows through the pipe W' having suitable cocks into the vessel Z', provided with the float $Z^7$ directly below the outlet-end of the tube W' and guided in said end, so that said float automatically closes said end of the tube W' when a sufficient quantity of cream has been collected in the receptacle Z'. From the receptacle or receiver Z' the cream passes through the tube $J^2$ into a fixed cylindrical vessel A, which is attached to the cross-beam B fastened to the fixed standards C. Through a hole in the bottom of the cylindrical vessel A the cream passes into the bottom section $u$ of the rotating cylinder D, which is provided with wings V, said section $u$ being arranged directly above the bottom of the rotating cylinder D. The rotating cylinder D is arranged concentrically with the cylindrical vessel A. From the compartment $u$ in the bottom of the rotating cylinder D the cream passes through suitable openings $u'$ $u^2$ $u^3$ into the cylinder D where the separation of the butter particles from the cream takes place. The cylinder D is closed at the top by the bottom of a vessel E. Toward the middle or center of the rotating cylinder D three annular concentric partitions $c$ $d$ $e$ are provided which surround each other. In said partitions a great number of slots are arranged in such a manner that the slots of the middle partition are at right angles to the slots in the inner and outer partitions. In the drawings the horizontal slots are in the inner and outer partitions and the vertical slots in the intermediate partition, but this arrangement may be reversed. As the particles of butter that have separated from the cream by the centrifuging operation are forced by the fresh cream through the slots of said partitions and against the cylindrical vessel A, they approach each other to such an extent as to become united and form butter. The outer surface of the cylindrical vessel A is shaped like a screw, which during the rotation of the cylinder D forces the mass surrounding it from the cylinder D into the open chamber or vessel E and through the opening E in the bottom of said vessel E. The buttermilk that has been separated from the cream passes from the cylinder D through a hole $h'$ into the channel $h^2$ and through a hole $h^3$ in a plug $k$, from which plug a channel leads to the side of the vessel, so that the buttermilk is thrown into a receptacle $y^2$ surrounding the rotating cylinder D and having a suitable outlet. The screw-plug $k$ regulates the discharge of the buttermilk and the milk. If butter is to be produced, the plug is about half closed, but if only the cream is to be separated the plug is open almost entirely. The butter, which even after the buttermilk has been separated contains as much as thirty per cent. of watery liquid is pressed in the upper compartment E of the rotating cylinder against the inclined plates F at the sides of the same, which plates are provided with apertures and covered with one or more layers of linen or other suitable material acting as a screen. The inclined partition F is only provided with apertures below the dotted line $f$. An annular hood $a$ on the top of the cylindrical vessel A and a short distance above the bottom of the vessel E prevents the butter from creeping up on the walls of said cylindrical vessel A. As the butter is pressed against the screen partition F all the fluid particles are pressed out of the same. The greater part of said liquids pass through the screen partition F into the space between said partition and the side-walls of the vessel E and then pass through a hole $g$ in said vessel into the fixed vessel $y'$ surrounding the rotating cylinder D and then through a suitable outlet of said vessel $y'$. A small part of the liquid remains with the butter, which butter adheres to the screen-partition F and forces itself to the upper edge of said partition where it is scraped off by a scraper $s$, which is preferably made of wood and suspended from one of the cross-beams B of the frame. The liquid still contained in the butter at all times keeps the scraper $s$ wet, so that the butter will not adhere to the same.

For the purpose of coloring the butter a tube X is provided which discharges into the tube $Z^2$, the upper end of which tube X is made funnel-shaped. The butter color drops from a suitable receptacle $Z^6$, so that the butter color is mixed with the cream as the same enters the centrifugal machine.

For the purpose of salting the butter, a perforated tube $b$ surrounds the cylindrical vessel A directly above the hood $a$ and into this tube the brine is conducted so as to pass from the said tube upon the hood $a$ and then flow into the butter and with the same is carried upward against the screen partition F. The entire rotating part of the machine, that is, the rotating cylinder D and its open upper compartment E are supported by a step-pivot H resting upon a ball M, which in turn rests in a cavity in the upper end of a screw N, and said step-pivot H is surrounded by a cylindrical bearing I for the purpose of guiding it. To the under side of the rotating cylinder D a tubular pulley L is secured, which surrounds the bearing I and around the pulley a belt or cord is passed for driving the machine.

If in this machine margarine is to be produced, the fluid substance used for the same, for example, a mixture of oleomargarine and ground nut oil is conducted into the vessel $Z^3$ and passes from the same into the pipe $Z^4$ into the cylindrical vessel A and from the same into the rotating cylinder when the same is at full speed, and by the time that the milk or cream that has previously been conducted into the vessel has about filled the separating chamber V. The rods $Z^5$ serve for regulating the flow from the vessel $Z^3$ into the cylindrical vessel A. In this case the ring F is removed and the cream is discharged through the hole $g$.

Having thus described my invention, what I claim as new, and desire to secure by Letters Patent, is—

1. A centrifugal butter-making machine provided with a rotating cylinder, a fixed cylindrical vessel arranged concentrically within said rotating-vessel, the outer surface of said fixed cylindrical vessel being provided with a thread, substantially as set forth.

2. In a centrifugal butter-making machine, the combination with a rotating cylinder having an upper and lower compartment separated by a horizontal partition having a central aperture, of a fixed cylindrical vessel arranged concentrically within the rotating vessel and having a screw-thread formed on its outer surface, substantially as set forth.

3. In a centrifugal butter-making machine, the combination with a rotating cylinder, of a series of annular concentric partitions, which partitions are provided with slots, the slots of one partition being at right angles to the slots of the adjacent partition, substantially as set forth.

4. In a centrifugal butter-making machine, the combination with a rotating cylinder, of a fixed cylindrical vessel arranged concentrically and provided with a screw-thread on its outer surface, of a hood surrounding said fixed cylindrical vessel and a perforated distributing tube above said hood, substantially as set forth.

5. In a centrifugal butter-making machine, the combination with a rotating cylinder divided into compartments by a horizontal partition, of an inclined annular perforated partition along the side-walls of the upper compartment and of a fixed cylindrical vessel arranged concentrically within the rotating cylinder and having a screw-thread on its outer surface, substantially as set forth.

In testimony that I claim the foregoing as my invention I have signed my name in presence of two subscribing witnesses.

THORVALD TAGE AGATON HANSEN.

Witnesses:
G. HOFMAN-BARY,
FRITZ TÖNBERG.